(12) United States Patent
Okuno

(10) Patent No.: US 6,361,224 B1
(45) Date of Patent: Mar. 26, 2002

(54) FILM TRANSPORT DEVICE AND CAMERA

(75) Inventor: Ryoji Okuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,234

(22) Filed: Nov. 29, 1999

(51) Int. Cl.[7] ................................................. G03B 1/12

(52) U.S. Cl. ........................ 396/413; 396/415; 396/418

(58) Field of Search ................................. 396/413, 415, 396/418, 411; 242/356

(56) References Cited

U.S. PATENT DOCUMENTS 5,568,214 A  * 10/1996  Stieher ........................ 396/411

* cited by examiner

Primary Examiner—W. B. Perkey
(74) Attorney, Agent, or Firm—Robin, Blecker & Daley

(57) ABSTRACT

A film transport device includes a spool arranged to take up and wind thereon a film pulled out from a film cartridge, a motor disposed within the spool, a spool gear arranged to have an output of the motor transmitted thereto and to drive the spool, the spool gear being arranged to be coaxial with the spool and to drive the spool only by the rotation in one direction thereof, and a film cartridge driving mechanism arranged to transmit the output of the motor to a film cartridge through the spool gear.

28 Claims, 14 Drawing Sheets

FIG. 5
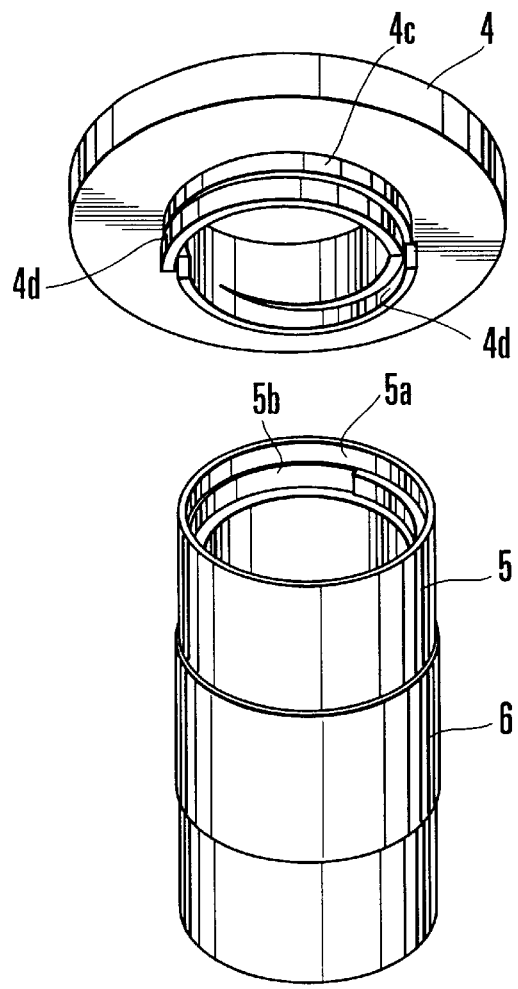
FIG.6(a)  FIG.6(b)
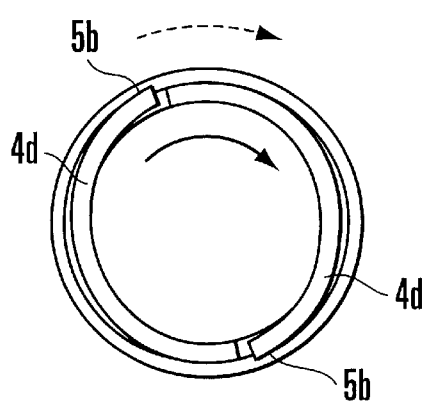 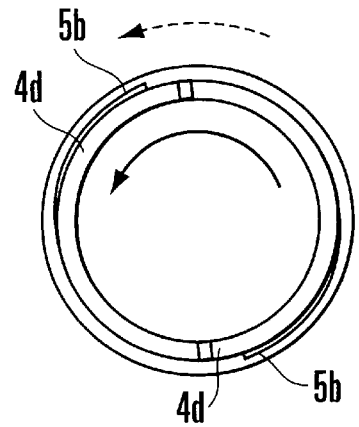

FIG.8(a)
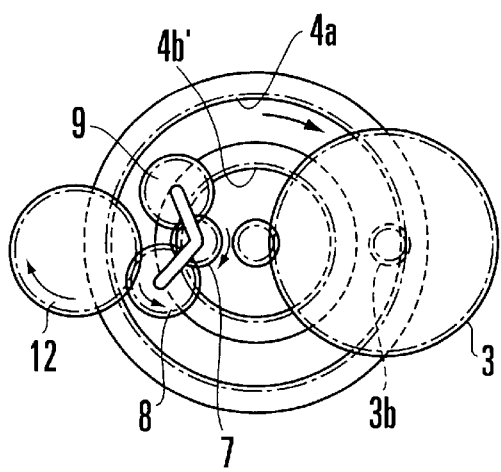
FIG.8(b)
FIG.8(d)
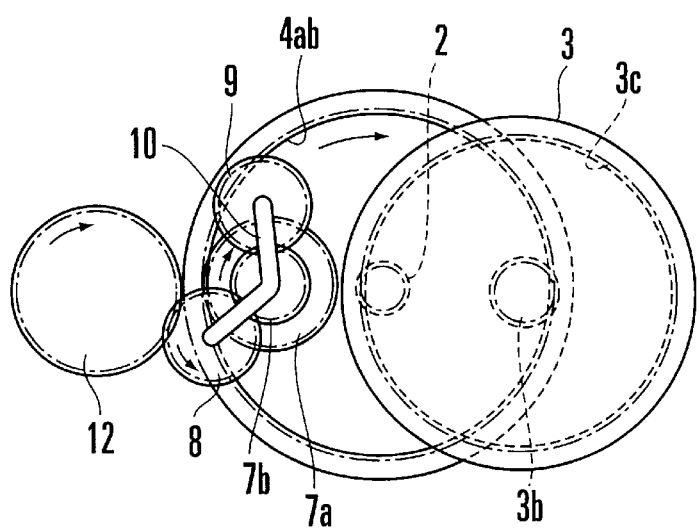
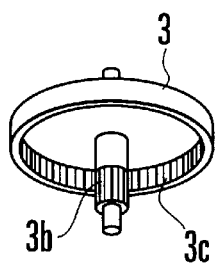
FIG.8(e)
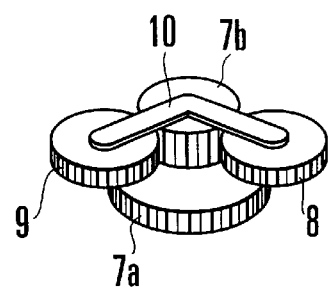
FIG.8(c)
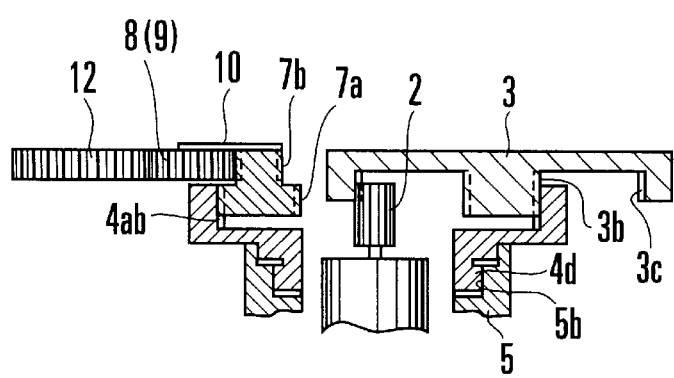

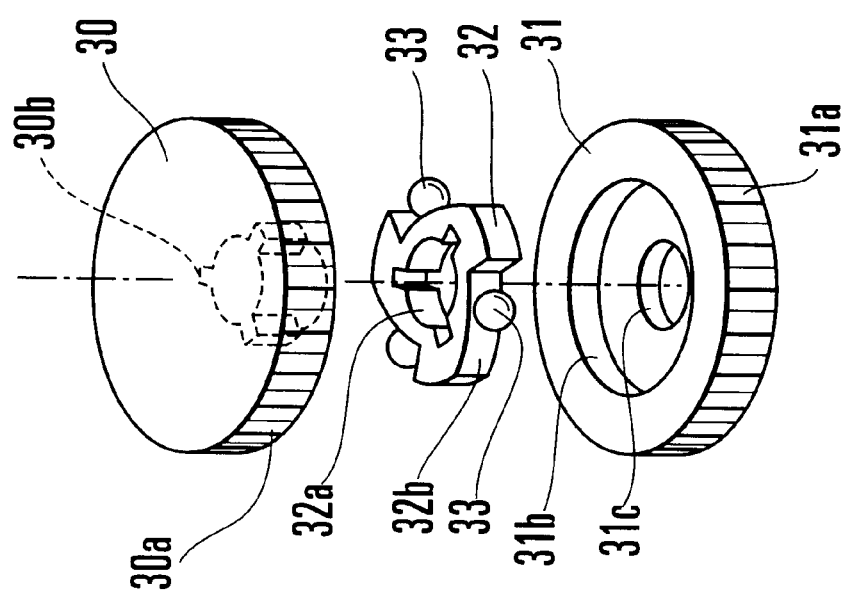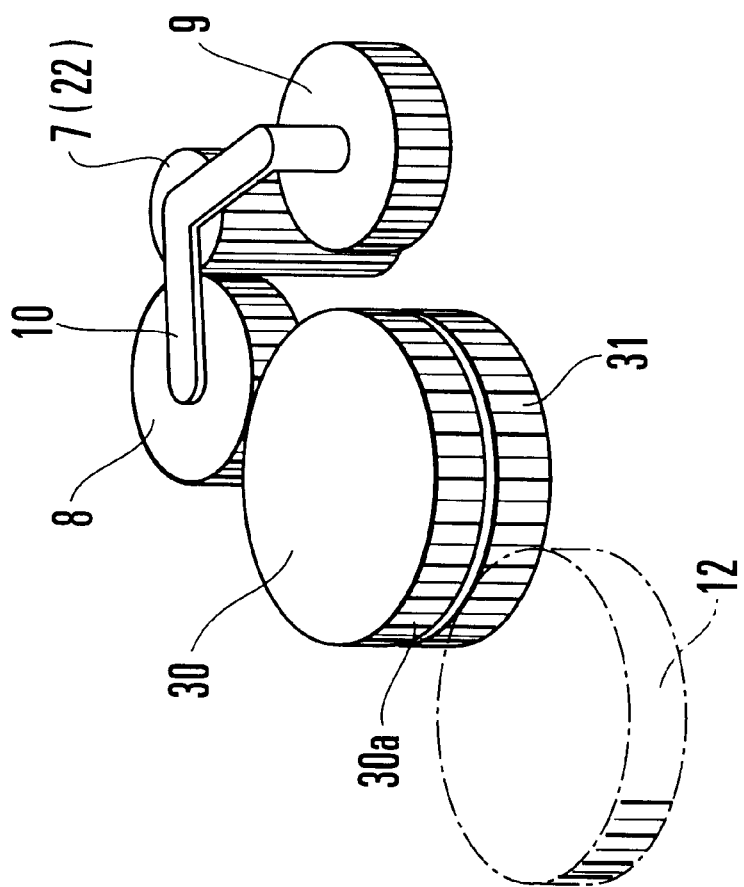
FIG.19(a)
FIG.19(b)

FILM TRANSPORT DEVICE AND CAMERA

BACKGROUND OF THE INVENTION

1. Field of the Invention

The present invention relates to a film transport device for winding and rewinding a film and also to a film using apparatus or an optical apparatus having the film transport device.

2. Description of Related Art

Film cartridges of the kind having a photographic film contained therein in its entirety before use of the film, as disclosed in U.S. Pat. No. 4,832,275 and U.S. Pat. No. 4,834,306, have been put into practical use.

The film contained in the film cartridge of this kind must be driven to be wound up and rewound by a film transport device. The film transport device is required to perform the following three basic transport driving actions. A first transport driving action is a thrust driving action which is performed to send the film out from the cartridge, after the apparatus is loaded with the cartridge, by imparting a rotating force to a spool disposed within the cartridge. A second transport driving action is a film winding driving action which is performed to drive a film winding shaft disposed within the apparatus to cause the film sent out from the cartridge to be wound on the film winding shaft. A third transport driving action is a film rewinding driving action which is performed to rewind the film back to the inside of the cartridge by driving the spool disposed within the cartridge.

In addition to the above three basic transport driving actions, there are the following two design requirements. A first requirement is either to cancel the thrust driving action on the intra-cartridge spool immediately after the film is thrust-driven out of the cartridge and wound on the film winding shaft to be subjected to the film winding driving action, or to make a speed at which the film is fed by thrust driving onto the outermost circumferential part of a coil of film on the film winding shaft coincide with a film speed obtained at the outermost circumference of the film coil on the film winding shaft. This is necessary for preventing the film from being caused to sag and slacken or stretch too tight by a difference in speed between the thrust driving action and the film winding driving action.

A second requirement applies to a case where the film must be wound again after rewinding the film not completely while one round of film winding driving is still in process. For example, in cases where magnetic recording is possible on the film, it becomes sometimes necessary to correct a magnetic record or to confirm magnetic information recorded on the film by rewinding and winding the film. In such a case, a winding force must be transmitted to the film winding shaft while the film is in process of being wound, and must be not transmitted to the film winding shaft while the film is in process of being rewound. In other words, during the film rewinding driving action, a film speed at the outermost circumference of film coiled on the spool within the cartridge and a film speed at the outermost circumference of film coil on the film winding shaft must be arranged to always coincide with each other. This is necessary for preventing the film from being stretched or loosely wound on the film winding shaft or inside of the film cartridge with the film driven to be rewound at two different speeds.

Known film transport devices arranged to meet the above-stated requirement for the three film transport driving actions and the two design requirements include devices disclosed in Japanese Laid-Open Patent Application No. HEI 10-239743 and U.S. Pat. No. 5,568,214.

The film transport device disclosed in Japanese Laid-Open Patent Application No. HEI 10-239743 is arranged as follows. In thrust-driving a film from inside of a film cartridge, a motor power is reduced in speed by a reduction gear to obtain a film winding force. The film winding force is transmitted from the reduction gear to a winding shaft gear disposed at a film winding shaft to obtain a driving force. The driving force is outputted from the film winding shaft to drive the cartridge. During the film rewinding driving action, a power change-over means is operated at a front stage of input to the film winding shaft to cut off any input to the film winding shaft, and the film rewinding driving action is performed on the cartridge through a second gear connection part which excludes the winding shaft.

The film transport device disclosed in U.S. Pat. No. 5,568,214 is arranged as follows. To prevent any driving force from being transmitted to the film winding shaft during the film rewinding driving action, a clutch is interposed in between the film winding shaft and a winding shaft gear which is coaxial with the film winding shaft. The driving force of the winding shaft gear is allowed to be transmitted to the film winding shaft only at the time of the film winding driving action. Unlike in the case of Japanese Laid-Open Patent Application No. HEI 10-239743, this arrangement obviates the necessity of arranging a power change-over means at the film winding shaft gear to be used for changing power transmission from the film winding driving action over to the film rewinding driving action. In other words, in this case, the film winding shaft gear can be left in a state of appearing to be constantly in connection with a motor.

BRIEF SUMMARY OF THE INVENTION

In accordance with one aspect of the invention, there is provided a film transport device, in which a clutch is disposed between a spool and a spool gear arranged to drive the spool, and the output of a motor is transmitted to a film cartridge through the spool gear, so that the spool gear can be used as an idler gear, and the film transport device can be compactly arranged.

The above and other aspects and features of the invention will become apparent from the following detailed description of preferred embodiments thereof taken in connection with the accompanying drawings.

BRIEF DESCRIPTION OF THE SEVERAL VIEWS OF THE DRAWING

FIG. 5 is an exploded perspective view showing a rotation transmission gear and a film winding shaft in the film transport device.

FIGS. 6(a) and 6(b) show how the rotation transmission gear and the film winding shaft are engaging and disengaging each other.

FIGS. 8(a) to 8(e) are plan views, a sectional view and perspective views respectively showing essential parts of the film transport device according to the modification of the first embodiment.

FIGS. 19(a) and 19(b) are perspective views showing essential parts of a film transport device according to a modification of each of the first, second and third embodiments.

DETAILED DESCRIPTION OF THE INVENTION

Hereinafter, preferred embodiments of the invention will be described in detail with reference to the drawings.
(First Embodiment)

FIG. 1 to FIGS. 6(a) and 6(b) show a film transport device according to a first embodiment of the invention. The film transport device is adapted for film-using apparatuses or optical apparatuses of varied kinds, such as a camera, a film viewing apparatus, etc. (Other embodiments described herein are also adapted likewise.) Further, the film transport device is loaded with a film cartridge 15.

Figure 1:
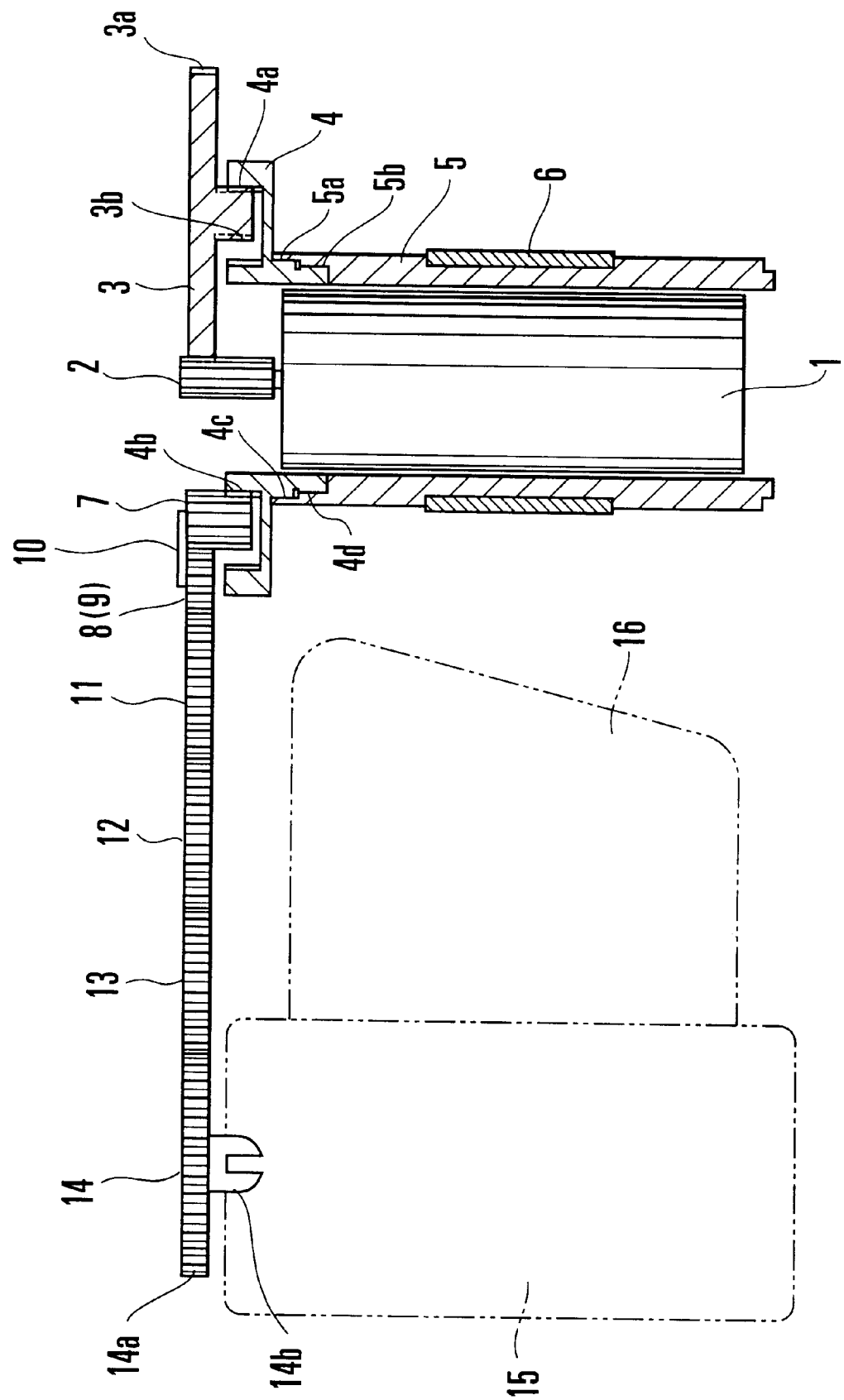
FIG. 1 is a sectional view of a film transport device according to a first embodiment of the invention.

Referring to FIG. 1, a motor 1 is provided for transporting a film 16 and is disposed within a film winding shaft (or a film winding spool) 5. A pinion gear 2 is secured by press-fitting to the fore end of the output shaft of the motor 1.

A reduction gear 3 of two-step arrangement forms a reducing transmission system. The reduction gear 3 has a large diameter part 3a in mesh with the pinion gear 2 and a small diameter part 3b in mesh with the input gear part 4a of a rotation transmission gear (a spool gear) 4.

As shown in detail in FIG. 5 and FIGS. 6(a) and 6(b), a cylindrical part 4c of the rotation transmission gear 4 is rotatably fitted into an inner circumferential fitting engaging part 5a of the film winding shaft 5, which is arranged to rotate coaxially with the rotation transmission gear 4. Further, in a case where the motor 1 disposed within the film winding shaft 5 is coaxial with the film winding shaft 5, as in the case of the first embodiment, the rotation transmission gear 4 is also coaxial with the motor 1.

At a lower part of the cylindrical part 4c of the rotation transmission gear 4, there are formed, integrally therewith at a plurality of positions in the direction of circumference thereof, lock claws 4d which gradually spread outward in the direction of diameter from the cylindrical part 4c and have arm parts elastically-deformable in the direction of diameter. Further, at a lower part of the inner circumferential fitting engaging part 5a, there are formed engaging grooves 5b which gradually become deeper from the inner circumferential fitting engaging part 5a outward in the direction of diameter. When the cylindrical part 4c is fitted into the inner circumferential fitting engaging part 5a, the lock claws 4d become lightly pushed against the slanting faces of the engaging grooves 5b.

Referring to FIG. 6(a), the end faces of the lock claws 4d which spread outward in the direction of diameter come to abut on the end faces of the engaging grooves 5b when the rotation transmission gear 4 rotates in one direction, i.e., clockwise in the case of FIG. 6, with respect to the film winding shaft 5. Therefore, when the rotation transmission gear 4 rotates in this direction, the rotation in the same direction is transmitted to the film winding shaft 5. When the rotation transmission gear 4 rotates in the other direction, i.e., counterclockwise, as shown in FIG. 6(b), with respect to the film winding shaft 5, the lock claws 4d are pushed by the slanting faces of the engaging grooves 5b to only escape from inside of the engaging grooves 5a while being elastically deformed inward in the direction of diameter. Therefore, the rotation of the rotation transmission gear 4 is not transmitted to the film winding shaft 5. In other words, a one-way clutch is formed by the lock claws 4d and the engaging grooves 5b.

A friction member 6 which is made of an elastic or adhesive material is wrapped around the shaft surface of the film winding shaft 5. The fore end part (leader part) of the film 16 which has been thrust-fed from the film cartridge 15 is pushed against the friction member 6 by some film pressing means which is not shown. Therefore, friction between the friction member 6 and the fore end part of the film 16 enables the film winding shaft 5 to wind the fore end part of the film 16 thereon.

The rotation transmission gear 4 is provided with an output gear part 4b. The diameter of the output gear part 4b is smaller than the diameter of the above-stated input gear part 4a.

A sun gear 7 is in mesh with the output gear part 4b of the rotation transmission gear 4. A cartridge driving gear 14 is composed of a gear part 14a and a fork part 14b which are formed integrally. The fork part 14b is arranged to engage a spool (not shown) disposed inside of the cartridge 15. Idler gears 11, 12 and 13 are arranged to transmit a driving force to the cartridge driving gear 14.

A thrust driving planet gear 8 is in mesh with the sun gear 7 and is rotatably supported by one of two arm parts of a fork-end shaped planetary plate 10, which is turnable around the sun gear 7. An elastic member such as a wave washer or the like is interposed in between the planetary plate 10 and the sun gear 7 in a charged state. The rotating force of the sun gear 7 is thus arranged to be transmitted to the planetary plate 10 by a frictional force. The sun gear 7, the planetary plate 10 and the thrust driving planet gear 8 constitute a first transmission change-over clutch. In thrust-driving the film, the first transmission change-over clutch transmits the rotative driving force of the rotation transmission gear 4 to the cartridge driving gear 14 with the thrust driving planet gear 8 intermeshing with the idler gear 11. In film winding driving, the thrust driving plant gear 8 disengages (or is repelled) from the idler gear 11 to cut off the transmission of this driving force of the rotation transmission gear 4.

A rewinding driving planet gear 9 is in mesh with the sun gear 7 and is rotatably supported by the other arm part of the fork-end shaped planetary plate 10, which is turnable around the sun gear 7. The sun gear 7, the planetary plate 10 and the rewinding driving plant gear 9 constitute a second transmission change-over clutch. In rewinding the film, the second transmission change-over clutch transmits the rotative driving force of the rotation transmission gear 4 to the cartridge driving gear 14 with the rewinding driving planet gear 9 intermeshing with the idler gear 11. In thrust-driving the film and also in winding the film, the rewinding driving planet gear 9 disengages and parts from the idler gear 11 to cut off the transmission of this driving force.

A cartridge driving system is formed by a gear train from the sun gear 7 to the fork part 14b of the cartridge driving gear 14. The cartridge driving system is located opposite to the reduction gear 3 across the center of rotation of the rotation transmission gear 4.

The film 16 is contained inside the film cartridge 15 in the initial stage thereof. When the spool of the film cartridge 15 is driven by the fork part 14b of the cartridge driving gear 14 with the gear 14 driven to rotate in the direction of thrust, the film 16 is moved out from the inside of the film cartridge, 15 as shown in FIG. 1.

Figure 2:
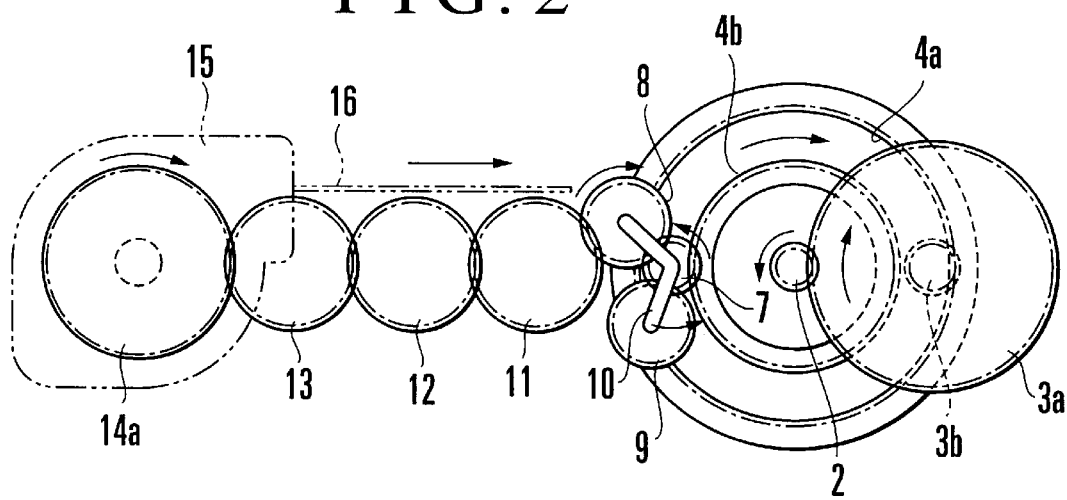
FIG. 2 is a plan view showing the film transport device in a state obtained during thrust driving.

The operation of the film transport device according to the first embodiment of the invention is described next with reference to FIGS. 2, 3 and 4. FIG. 2 shows the film transport device in a state obtained at the time of thrust driving. Referring to FIG. 2, the driving force of the motor 1 is transmitted through the pinion gear 2 to the reduction gear 3. The reduction gear 3 greatly differs in number of teeth from the pinion gear 2 to reduce the driving force in speed at once (through the large diameter gear part 3a and the small diameter gear part 3b). The driving force is thus more efficiently slowed down than in a case where speed reduction is made stepwise with small reduction gears. The driving force thus reduced in speed is transmitted as it is to the input gear part 4a of the rotation transmission gear 4. Then, the rotation transmission gear 4 is caused to rotate clockwise as indicated by an arrow in FIG. 2.

The first embodiment is thus arranged to obviate the necessity of having any means such as a planet gear for change-over of the path of transmission of the driving force from the motor 1 to the rotation transmission gear 4. The arrangement permits reduction in number of parts and obviates the necessity of having a wasteful space for moving a planet gear or the like. Besides, since a distance between rotating shafts can be fixed, the reducing transmission system for transmission to the rotation transmission gear 4 can be arranged with high precision.

When the rotation transmission gear 4 rotates clockwise, as shown in FIG. 6(a), the lock claws 4d which rotate integrally therewith engage the engaging grooves 5b of the film winding shaft to transmit the driving force of the rotation transmission gear 4 to the film winding shaft 5, thereby driving the film winding shaft 5 to rotate clockwise Then, further clockwise rotation of the rotation transmission gear 4 causes, as shown in FIG. 2, the sun gear 7 which is in mesh with the output gear part 4b of the rotation transmission gear 4 to rotate counterclockwise, thereby causing the planetary plate 10 to turn also counterclockwise. This causes the thrust driving planet gear 8 to mesh with the idler gear 11. The idler gear 11 then transmits the driving force from the rotation transmission gear 4 to the cartridge driving gear 14 (gear part 14a) through the idler gears 12 and 13. Accordingly, the cartridge driving gear 14 rotates clockwise, so that the fork part 14b, which engages the spool of the cartridge 15, then drives the spool to rotate clockwise. The clockwise rotation of the spool thrusts and feeds the film 16 from inside of the cartridge 15 toward the film winding shaft 4.

In the case of the first embodiment, the rotation transmission gear 4 is composed of the input gear part 4a which has a large diameter and the output gear part 4b which has a small diameter. The driving force from the reduction gear 3b is reduced in speed to a great extent by the difference in diameter (a difference in number of teeth) the input gear part 4a and the output gear part 4b of the rotation transmission gear 4. This arrangement permits compact arrangement of parts around the film winding shaft 5 and thus permits reduction in number of parts and in cost.

On the other hand, if the film transport device is arranged such that the output for the cartridge driving system is not taken from the rotation transmission gear 4, it becomes necessary to additionally provide another reducing mechanism exclusively used for driving the cartridge, resulting in an increase in size of a gear train and in number of parts around the film winding shaft 5. In particular, in a case where the film transport device is arranged to drive the film winding shaft 5 with a driving force obtained by reducing in speed the driving force of the motor 1 through the reduction gear 3 by two steps, as in the first embodiment, the rate of reduction per step is large. In such a case, therefore, if the film transport device is not arranged to take out the output for the cartridge driving system from the rotation transmission gear 4, it becomes necessary to have a reduction mechanism arranged solely for speed reduction of the output for the cartridge driving system even in a case where a winding shaft gear is connected to a motor without any power change-over arrangement as in the case of the device disclosed in U.S. Pat. No. 5,568,214 cited in the foregoing. The use of such an additional reduction mechanism results in an increase in size of the device.

Figure 3:
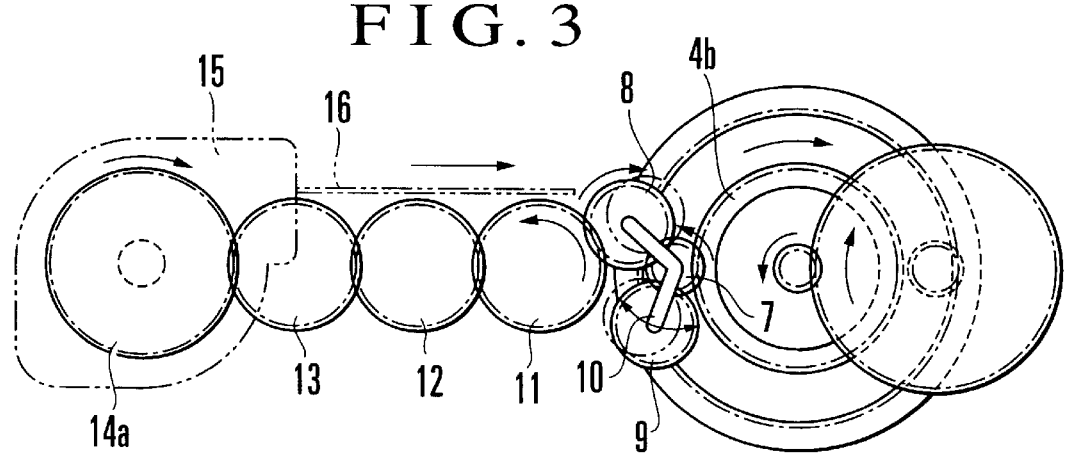
FIG. 3 is a plan view showing the film transport device in a state obtained during film winding driving.
Figure 4:
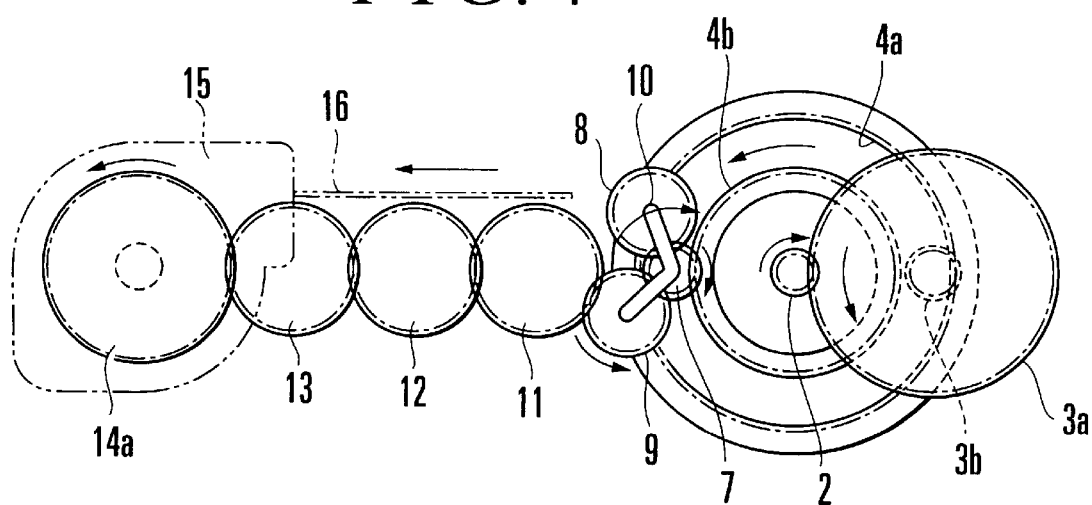
FIG. 4 is a plan view showing the film transport device in a state obtained during film rewinding driving.

FIG. 3 shows the film winding driving action in the first embodiment. In FIG. 3, the film 16 is shown in the same state as in FIG. 2. In the case of FIG. 3, however, the film 16 is assumed to be already wound on the film winding shaft 5.

With the film 16 thrust-fed and wound on the film winding shaft 5 as mentioned above, a speed of film winding obtained on the film winding shaft 5 becomes faster than a speed of thrust-feeding the film from the film cartridge, because of a reduction ratio set. As a result, a tensile force acts on the film 16. The tensile force is transmitted to the spool of the film cartridge 15. Then, the fork part 14b, which is rotating clockwise for thrust driving, is caused to rotate clockwise at a faster speed by the tensile force transmitted.

This rotating force resulting from the tensile force is transmitted to the cartridge driving gear 14 and the idler gears 13, 12 and 11 one after another, in this sequence. The idler gear 11 is thus caused to rotate counterclockwise at a faster speed than the speed of transmission from the thrust driving planet gear 8.

Therefore, the thrust driving planet gear 8, which has been in mesh with the idler gear 11 during the process of thrust driving, comes to be repelled by the idler gear 11 to become no longer capable of transmitting any driving force to the idler gear 11. Then, since the thrust driving planet gear 8 is constantly under the driving force of the sun gear 7, the thrust driving planet gear 8 tries to intermesh with the idler gear 11 again even after it is repelled. However, the intermeshing attempt is soon repelled. As a result, therefore, the driving force of the thrust driving planet gear 8 initiated by the motor 1 and transmitted through the rotation transmission gear 4 is not transmitted while the film winding driving is in process. Further, in this instance, the rewinding driving planet gear 9, which is supported by the other arm part of the planetary plate 10, also does not come into contact with the idler gear 11.

As shown in FIG. 6(a), the lock claws 4d of the rotation transmission gear 4 are engaging the engaging grooves 5b of the film winding shaft 5 to transmit a film winding driving force to the film winding shaft 5 also at the time of film winding driving. A film winding action is thus carried out solely by the film winding shaft 5. Therefore, the film 16 never slackens nor stretches while FIG. 4 shows the film rewinding action of the film transport device. In this case, the direction of rotation of the motor 1 is opposite to that of rotation for film winding. The sun gear 7 rotates clockwise to cause the planetary plate 10 to rotate also in the same direction. The thrust driving planet gear 8 is completely away from its position of intermeshing with the idler gear 11. The rewinding driving planet gear 9 intermeshes with the idler gear 11 to transmit the driving force The driving force is then transmitted to the cartridge driving gear 14 through the idler gears 12 and 13 to cause the fork part 14b which engages the spool of the film cartridge 15. The fork part 14b then rotates to rewind the film 16.

A reduction ratio is set to have the speed of rotation of the rotation transmission gear 4 caused by the motor 1 faster than the speed of rotation of the film winding shaft 5 caused by the film rewinding driving as shown in FIG. 6(b). The reduction ratio causes the lock claws 4d to slip over the engaging grooves 5a to prevent the motor driving force from the rotation transmission gear 4 from being transmitted to the film winding shaft 5. The film rewinding action is, therefore, carried out by the spool of the cartridge 15 alone without causing any stretching of film nor any slackening of film coiled on the film winding shaft 5 or on the spool of the cartridge 15 during the rewinding process.

(Modification of First Embodiment)

Figure 7A:
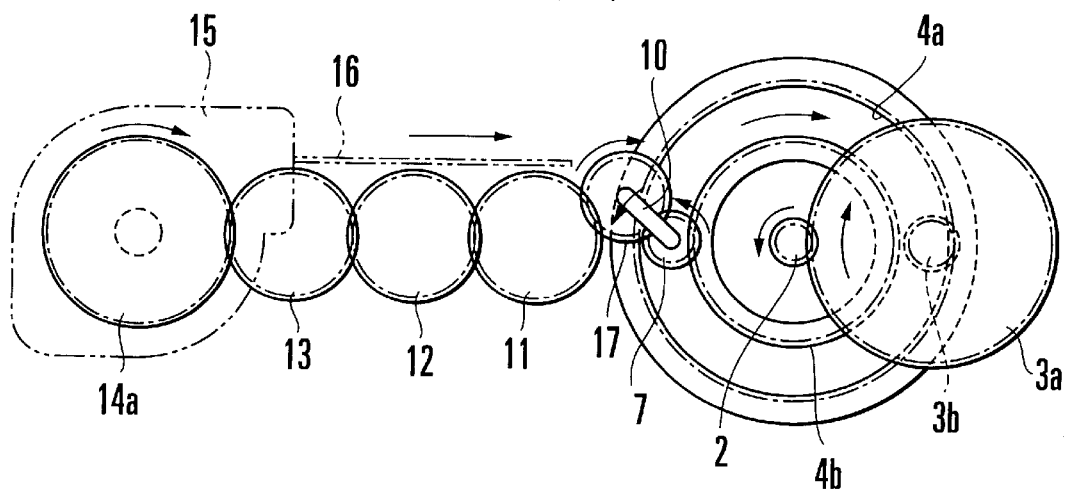
FIGS. 7(a) to 7(c) are plan views of a film transport device according to a modification of the first embodiment of the invention.
Figure 7B:
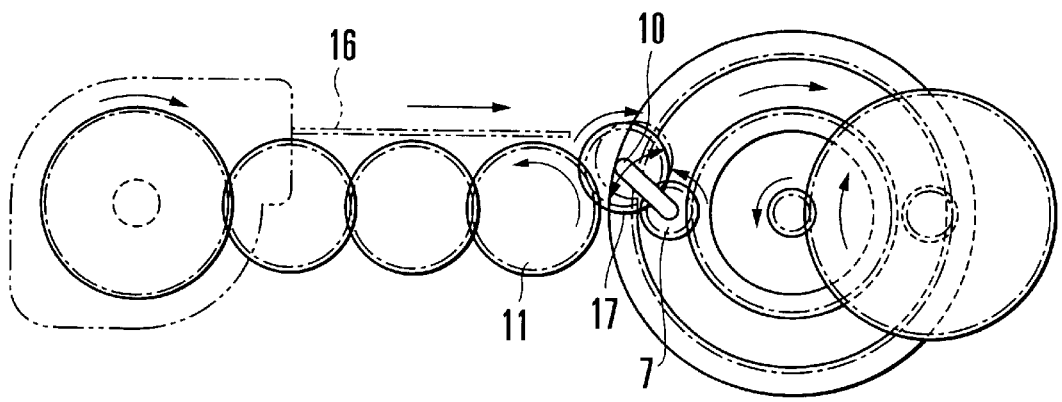
Figure 7C:
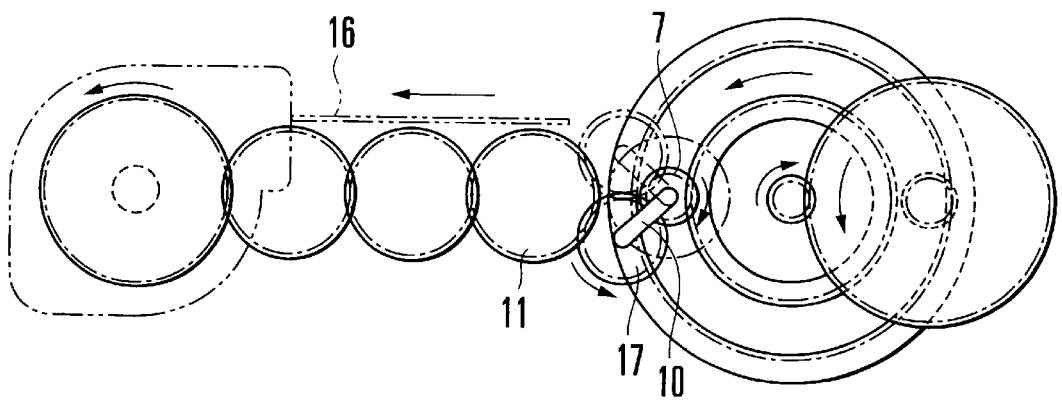

FIGS. 7(a), 7(b) and 7(c) show a film transport device according to a modification of the first embodiment of the invention. In FIGS. 7(a), 7(b) and 7(c), all component parts of the modification that are the same as those of the first embodiment are indicated by the same reference numerals. The film transport device is shown in a state obtained at the time of thrust driving in FIG. 7(a), in a state obtained at the time of film winding driving in FIG. 7(b) and in a state obtained at the time of film rewinding driving in FIG. 7(c).

In the modification of the first embodiment, one and the same planet gear 17 is arranged to have the first transmission change-over clutch function of the thrust driving planet gear 8 and the second transmission change-over clutch function of the rewinding driving planet gear 9 in the first embodiment.

In thrust driving as shown in FIG. 7(a), the planet gear 17 transmits the thrust driving force of the rotation transmission gear 4 to the cartridge driving gear 14 by intermeshing with the idler gear 11. In film winding driving as shown in FIG. 7(b), the driving force of the rotation transmission gear 4 is not transmitted to the cartridge driving gear 14 as the planet gear 17 is repelled by the idler gear 11. In film rewinding driving as shown in FIG. 7(c), the planet gear 17, which has been repelled by the idler gear 11 in film winding, revolves clockwise round the sun gear 7 to come to mesh with the idler gear 11, so that the film rewinding driving force of the rotation transmission gear 4 is transmitted to the cartridge driving gear 14.

According to the arrangement of the modification of the first embodiment, change-over of the action of transmitting the thrust driving force from the rotation transmission gear 4 to the cartridge driving gear 14, the action of not transmitting the film winding driving force and the action of transmitting the film rewinding driving force can be accomplished by means of a single transmission change-over clutch. This arrangement permits reduction in number of parts and simplification of structural arrangement.

In the cases of the first embodiment and the modification thereof, the rotation transmission gear 4 is arranged to have concentric double circular gear parts 4a and 4b and to have the sun gear in contact with the inner-side output gear part 4b in a circumscribed manner. However, this arrangement may be changed to have the sun gear 7 in contact with the inner-side output gear part 4b in an inscribed manner as shown in FIG. 8(a).

Further, the rotation transmission gear 4 may be changed to have no double gear part and arranged as shown in FIGS. 8(b), 8(c), 8(d) and 8(e). In FIGS. 8(b), 8(c), 8(d) and 8(e), the input gear part 4a in the first embodiment is changed into an input-and-output gear part 4ab, and the small diameter gear part 3b of the reduction gear 3 and the sun gear 7 are in mesh with the input-and-output gear part 4ab in an inscribed manner.

In the case of the above-stated change, since the input-and-out gear part 4ab is arranged to act as an idler gear, the effect of reduction in speed of the driving force from the drive source cannot be sufficiently attained on the cartridge driving side. However, the reducing effect can be sufficiently attainable for the cartridge driving system by using, for the reduction in speed, the stepped gear parts of the sun gear 7 including a large gear part 7a and a small gear part 7b which are in contact with the input-and-output gear part 4ab in the inscribed manner. That modification permits compact arrangement and reduction in thickness of the whole device as these parts can be arranged within a void space of the input-and-output gear parts 4ab which is relatively large in size. Further, the pinion gear, the reduction gear and the spool gear are all arranged to be internal-gear-connected. The arrangement ensures adequate intermeshing of gears for efficient transmission of the driving force.

(Second Embodiment)

FIGS. 9 to 12 show a film transport device according to a second embodiment of the invention. In the following description, all component parts that are the same as the component parts of the first embodiment are indicated by the same reference numerals, and the details of them are omitted from the following description.

Referring to FIGS. 9 to 12, an eccentric output member 18 is press-fitted into the fore end of the output shaft of the film transport motor 1. The eccentric output member 18 has an eccentric part 18a which is eccentric with respect to the axis of the output shaft of the motor 1 (hereinafter referred to as the motor axis). The eccentric part 18a is fitted into a hole 19a formed at the center of a spur gear 19 in such a way as to be rotatable with an extremely small load. Although it is not shown in the drawings, a bearing or the like may be interposed to ensure smooth transmission of a driving force from the eccentric part 18a to the spur gear 19.

The spur gear 19 is provided with a gear part 19c on its outer side. The gear part 19c has a little fewer number of teeth than an internal gear 20 which is intermeshing with the gear part 19c. The gear part 19c and the internal gear 20 are intermeshing in a state of having different axes of rotation from each other. The internal gear 20 is secured to the body of the device (not shown) with a screw 23 which is inserted into a hole part 20b of the internal gear 20. Further, the gear part 20a of the internal gear 20 is coaxial with the motor axis.

Figure 10:
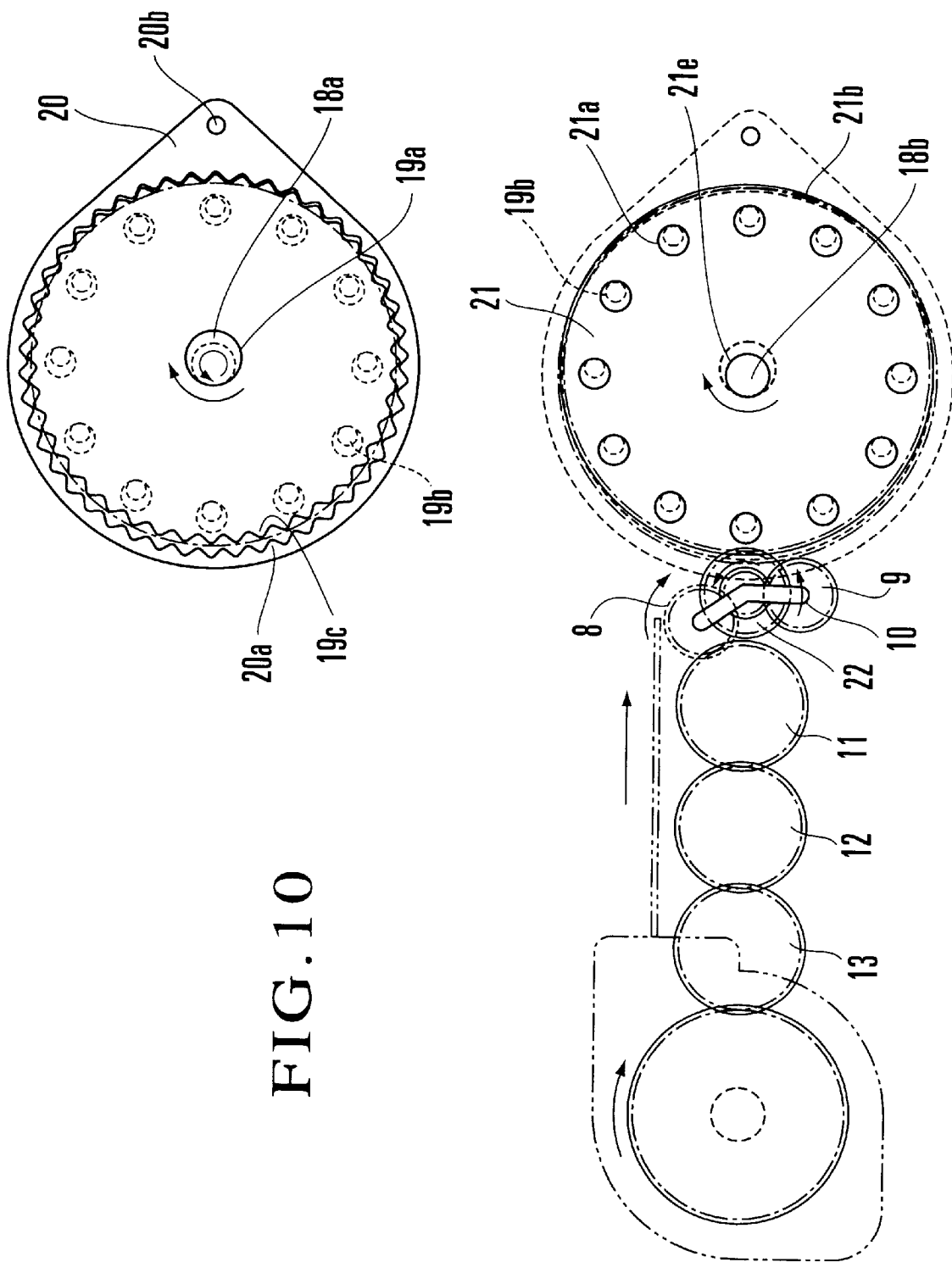
FIG. 10 is a plan view of the film transport device according to the second embodiment in a state obtained during thrust driving.

Referring to FIG. 10, when the eccentric output member 18 is driven to rotate by the motor 1, the spur gear 19 rotates in mesh with the gear part 20a of the internal gear 20 while maintaining the amount of its eccentricity with respect to the motor axis. However, the intermeshing position of the spur gear 19 with respect to the internal gear 20 shifts in the clockwise direction as much as a difference in number of teeth between the gear part 19c of the spur gear 19 and the gear part 20a of the internal gear 20, for example, every time the eccentric output member 18a makes one rotation in the counterclockwise direction. As a result, the spur gear 19 moves while rotating the center of its eccentricity clockwise around the motor axis.

Figure 9:
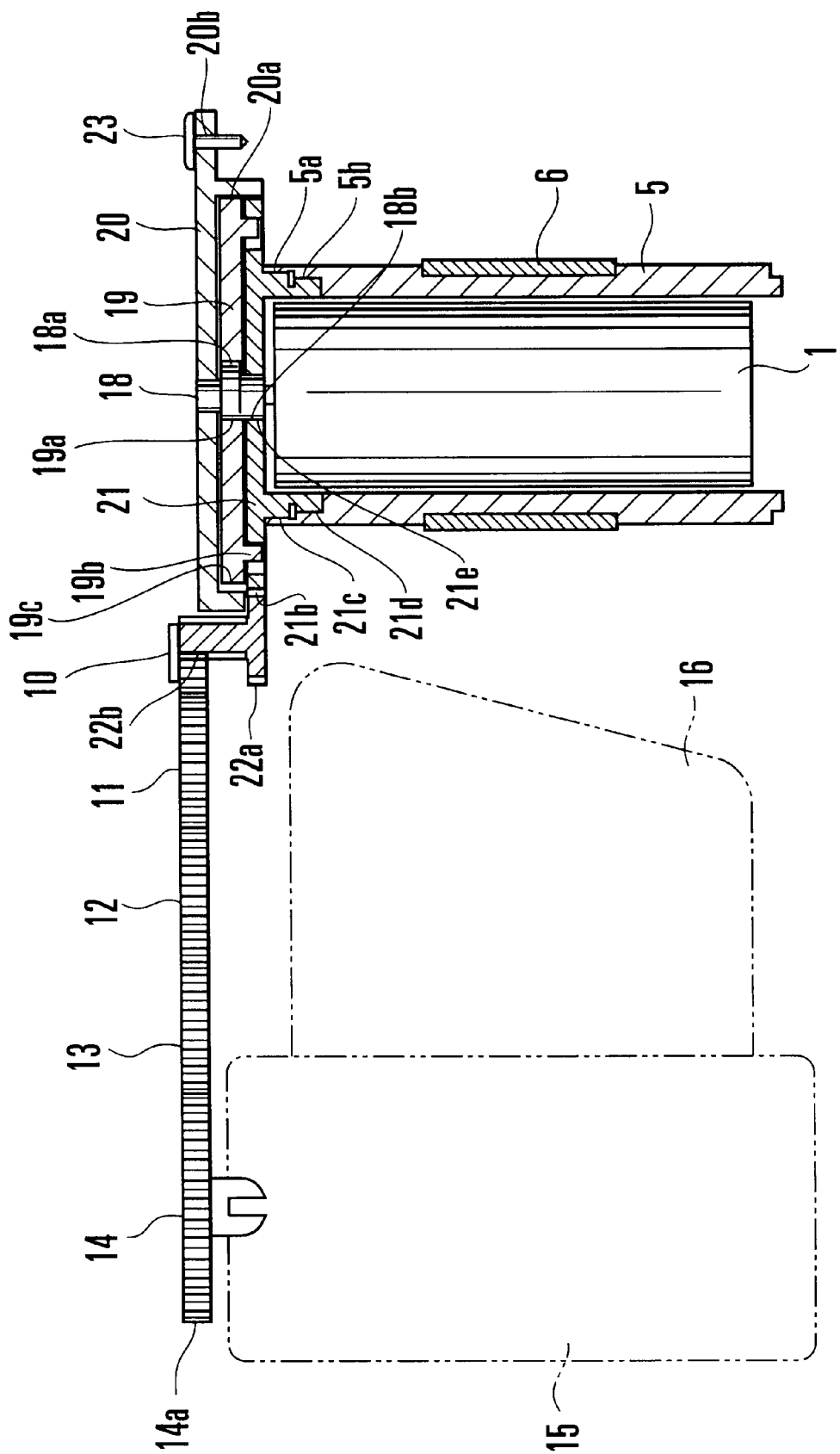
FIG. 9 is a sectional view of a film transport device according to a second embodiment of the invention.

A plurality of carrier pins 19b are evenly spaced in the circumferential direction on the lower side in the axial direction of the spur gear 19 as viewed in FIG. 9. The carrier pins 19b are inserted respectively in hole parts 21a provided on the upper side of a carrier 21 at equal spacing distances in the circumferential direction of the carrier 21.

When the spur gear 19 moves while rotating its center of eccentricity clockwise around the motor axis, the carrier 21 rotates clockwise on its hole part 21e which is fitted on the motor shaft 18b by the pressure of the carrier pins 19b. Further, a minor-teeth-difference reduction mechanism is formed jointly by the spur gear 19, the internal gear 20 and the carrier 21.

The carrier 21 is provided with a cylindrical part 21c which is fitted on the film winding shaft 5 in such a way as to be rotatable coaxially with the film winding shaft 5, and lock claws 21d which engage the engaging grooves 5a of the film winding shaft 5. The shapes and functions of these parts are similar to those of the cylindrical part 4c and the lock claws 4d in the first embodiment.

An output gear part 21b is formed along the periphery of the carrier 21 and intermeshes with a large diameter gear part 22a of a sun gear 22. A small diameter gear part 22b of the sun gear 22 is in mesh with a thrust driving planet gear 8 and a film rewinding driving planet gear 9 which are mounted respectively on the arm parts of a fork-end shaped planetary plate 10. An elastic member such as a wave washer or the like which is not shown is interposed in between the planetary plate 10 and the sun gear 22. The planetary plate 10 is thus arranged to be caused by a frictional force to rotate according to the rotating force of the sun gear 22 in the same direction as that of the sun gear 22.

The operation of the film transport device according to the second embodiment is next described. In thrust driving the film 16 as shown in FIG. 10, the lock claws 21d engage the engaging grooves 5a of the film winding shaft 5 to transmit the driving force of the motor 1 to the film winding shaft 5 through the carrier 21. At this time, the thrust driving planet gear 8 intermeshes with the idler gear 11. The rotation of the carrier 21 is thus transmitted to the cartridge driving gear 14 to thrust-drive the film 16.

Figure 11:
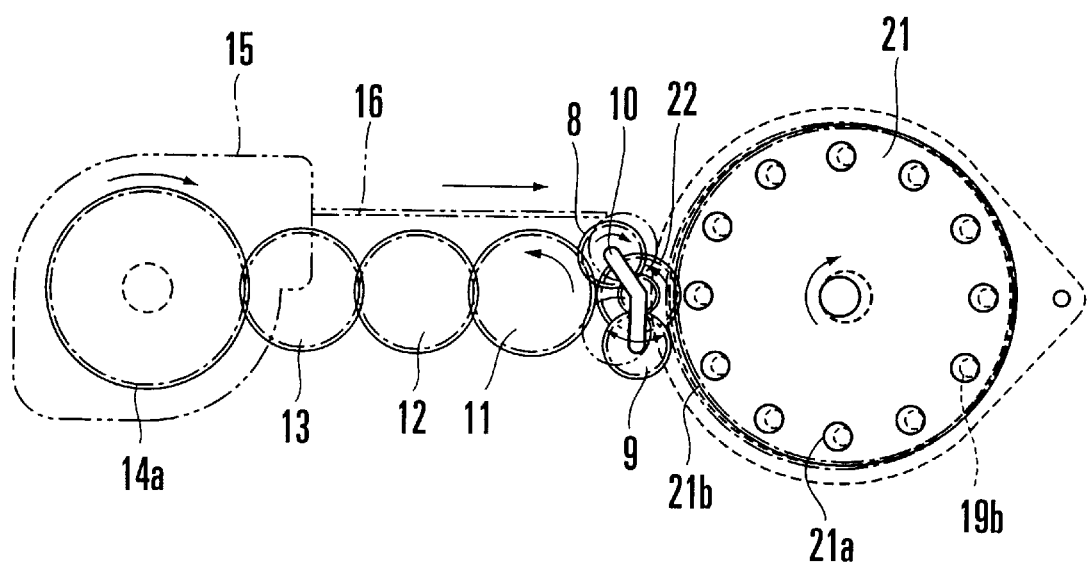
FIG. 11 is a plan view of the film transport device according to the second embodiment in a state obtained during film winding driving.

FIG. 11 shows a winding driving action on the film 16. In film winding, the driving force of the motor 1 is transmitted to the film winding shaft 5 through the carrier 21 in the same manner as in thrust driving. In this case, the thrust driving planet gear 8 is repelled by the idler gear 11, so that the rotation of the carrier 21 is not transmitted to the cartridge driving gear 14. The film winding shaft 5 is thus allowed to act alone to drive and wind the film 16.

Figure 12:
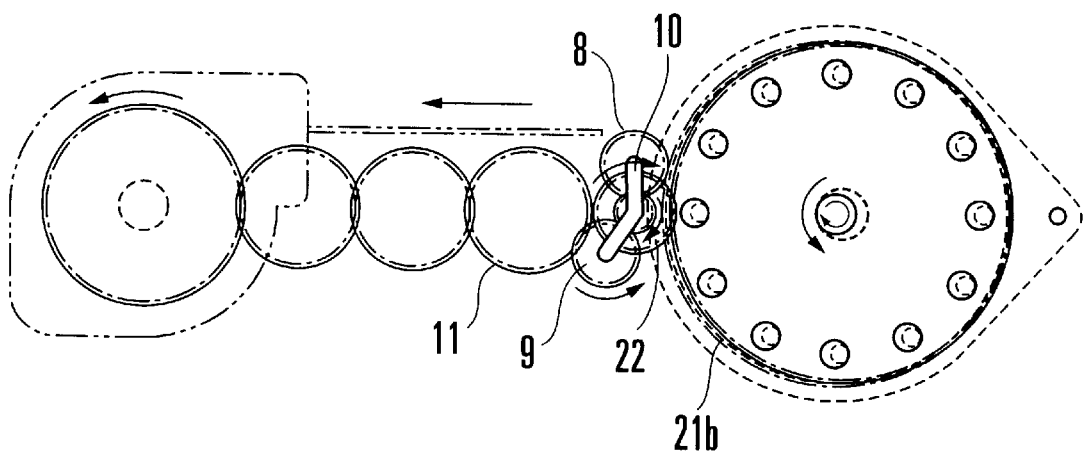
FIG. 12 is a plan view of the film transport device according to the second embodiment in a state obtained during film rewinding driving.

FIG. 12 shows a rewinding driving action on the film 16. In that case, the lock claws 21d of the carrier 21 are not engaging the engaging grooves 5a of the film winding shaft 5. Therefore, the driving force of the motor 1 is not transmitted to the film winding shaft 5. The film rewinding driving planet gear 9 intermeshes with the idler gear 11 to transmit the rotation of the carrier 21 to the cartridge driving gear 14. Then, the spool of the cartridge 15 alone drives and rewinds the film 16.

(Modification of Second Embodiment)

Figure 13A:
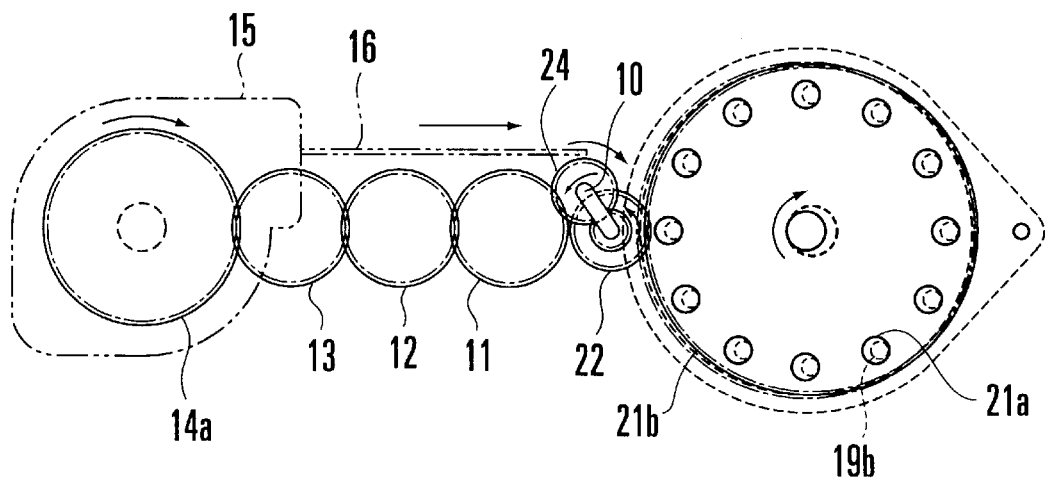
FIGS. 13(a) to 13(c) are plan views of a film transport device according to a modification of the second embodiment of the invention.
Figure 13B:
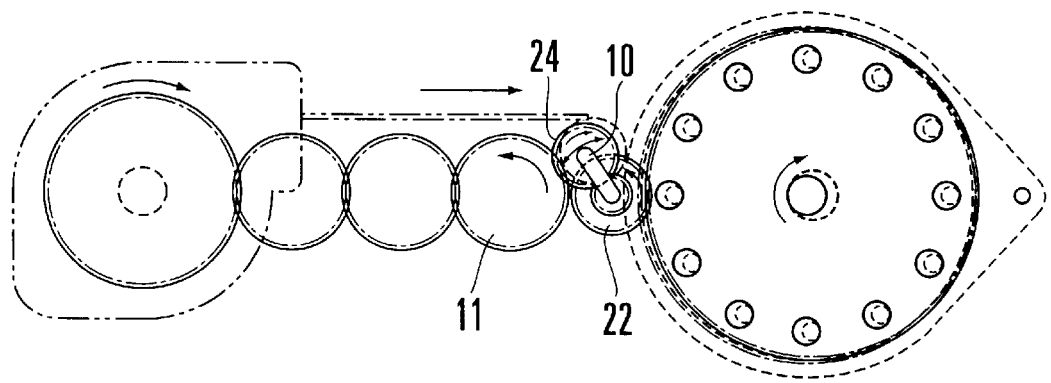
Figure 13C:
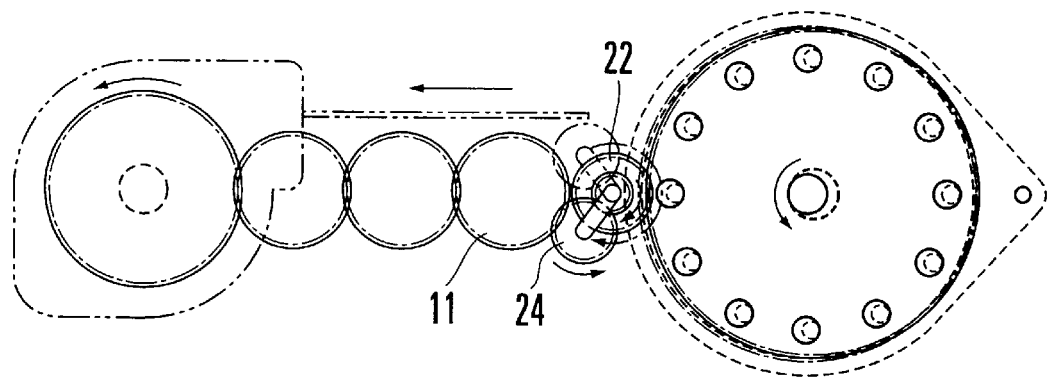

FIGS. 13(a), 13(b) and 13(c) show a film transport device according to a modification of the second embodiment. In FIGS. 13(a), 13(b) and 13(c), the same component parts as those in the second embodiment are indicated by the same reference numerals. FIG. 13(a) shows the film transport device in process of performing a thrust driving action on the film 16. FIG. 13(b) shows the film transport device in process of performing a winding action on the film 16. FIG. 13(c) shows the film transport device in process of performing a rewinding action on the film 16.

In the modification of the second embodiment, like in the modification of the firs t embodiment described in the foregoing, a planet gear 24 which serves as a transmission change-over clutch is arranged to perform both the first transmission change-over clutch function of the thrust driving planet gear 8 and the second transmission change-over clutch function of the rewinding driving planet gear 9 in the second embodiment.

In thrust driving as shown in FIG. 13(a), the planet gear 24 meshes with the idler gear 11 to transmit the thrust driving force of the carrier 21 to the cartridge driving gear 14. In film winding driving as shown in FIG. 13(b), the planet gear 24 is repelled by the idler gear 11, so that the driving force of the carrier 21 is not transmitted to the cartridge driving gear 14. In film rewinding driving as shown in FIG. 13(c), the planet gear 24 which is repelled by the idler gear 11 in film winding revolves clockwise around the sun gear 22 to come to intermesh with the idler gear 11 to transmit the film rewinding driving force of the carrier 21 to the cartridge driving gear 14.

According to the arrangement of the modification of the second embodiment, the transmission of the thrust driving force, nontransmission of the film winding driving force and transmission of the film rewinding driving force to the cartridge driving gear 14 can be switched from one over to another by means of a single transmission change-over clutch. The arrangement permits reduction in number of parts and simplification of structural arrangement.

(Third Embodiment)

FIGS. 14 to 17 show a film transport device according to a third embodiment of the invention. All the component parts in the third embodiment that are the same as those in the first embodiment are indicated by the same reference numerals as in the case of the first embodiment described in the foregoing.

Figure 14:
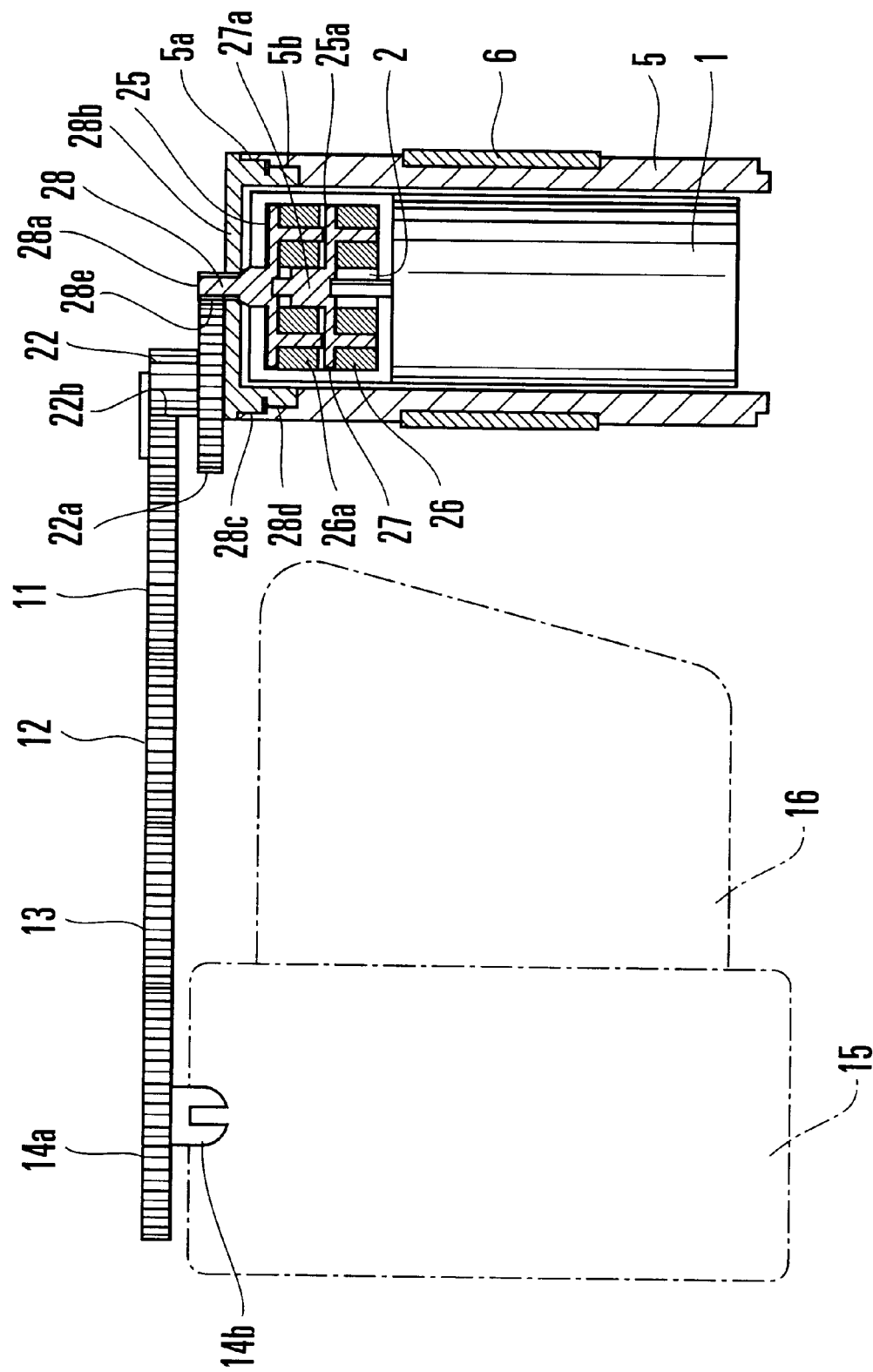
FIG. 14 is a sectional view of a film transport device according to a third embodiment of the invention.

Referring to FIGS. 14 to 17, a pinion gear 2 is press fitted to the fore end of the output shaft of the film transport motor 1. Three planet gears 26 which are rotatably carried by arm parts of a connection carrier 27 are evenly spaced in the direction of circumference around the pinion gear 2 (although only two of the gears 26 are shown in FIG. 14). The planet gears 26 are thus arranged to be revolvable around the pinion gear 2 which acts as a sun gear. The three planet gears 26 are in mesh with an internal gear 25a formed on the inner wall of a gear head external tube 25. The pinion gear 2, the planet gears 26, the internal gear 25a and the connection carrier 27 jointly form a planetary reduction mechanism which is generally called a planetary type reduction mechanism.

A sun gear 27a is arranged at the fore end of the connection carrier 27 to rotate coaxially with the pinion gear 2. Three planet gears 26a are arranged at equal spacing distances around the sun gear 27a and are rotatably carried by the arm part of an output carrier 28. These three planet gears 26a are thus arranged to be revolvable around the sun gear 27a. Further, the three planet gears 26a are in mesh with an internal gear 25a formed on the inner wall of the gear head external tube 25. A second stage planetary reduction mechanism is thus formed jointly by the sun gear 27a, the planet gears 26a, the internal gear 25a and the output carrier 28.

The output carrier 28 has a connection tube 28b mounted on the lower part of its shaft part 28a integrally with the shaft part 28a. In the case of the third embodiment, the output carrier 28 and the connection tube 28b are first discretely manufactured and assembled into one body. However, they may be molded in one body in the beginning. The whole output carrier 28 including the connection tube 28b is arranged to act as a rotation transmission member.

A circumferential wall part 28c of the connection tube 28b is rotatably fitted into the engaging inner circumferential part 5a of a film winding shaft 5. As in the lock claws 4d in the first embodiment, lock claws 28d are formed and arranged on the wall part 28c of the connection tube 28b to engage the engaging grooves 5b of the engaging inner circumferential part 5a of the film winding shaft 5.

An output gear part 28e is formed at an upper part of the shaft part 28a of the output carrier 28. The output gear part 28e is in mesh with a large gear part 22a of the sun gear 22. A small gear part 22b of the sun gear 22 is in mesh with the thrust driving planet gear 8 and the rewinding driving planet 9 which are rotatably carried by the arm parts of the fork-end shaped planetary plate 10 mounted on the rotation shaft of the sun gear 22. An elastic member, such as a wave washer or the like, which is not shown is interposed in a charged state in between the planetary plate 10 and the sun gear 22. The planetary plate 10 is thus arranged to be caused to rotate by a frictional force in the same direction as the sun gear 22 according to the rotating force of the sun gear 22.

Figure 15:
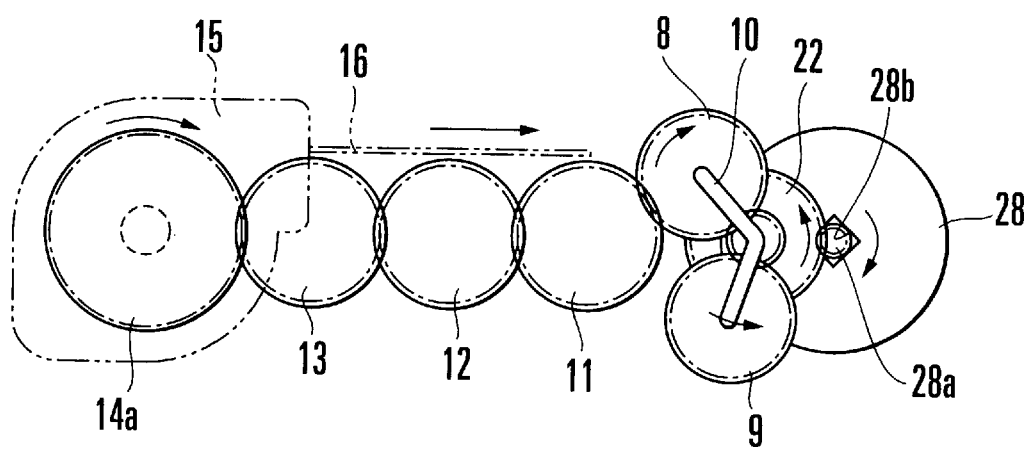
FIG. 15 is a plan view showing the film transport device according to the third embodiment in a state obtained during thrust driving.

The operation of the film transport device according to the third embodiment is next described. In thrust-driving the film 16 as shown in FIG. 15, the lock claws 28d of the output carrier 28 engage the engaging grooves 5b of the film winding shaft 5. The driving force of the motor 1 is then transmitted to the film winding shaft 5 through the two-stepped planetary reduction mechanism and the output carrier 28. In this instance, the thrust driving planet gear 8 intermeshes with the idler gear 11 to transmit the rotation of the output carrier 28 to the cartridge driving gear 14. The cartridge driving gear 14 then thrust-drives the film 16.

Figure 16:
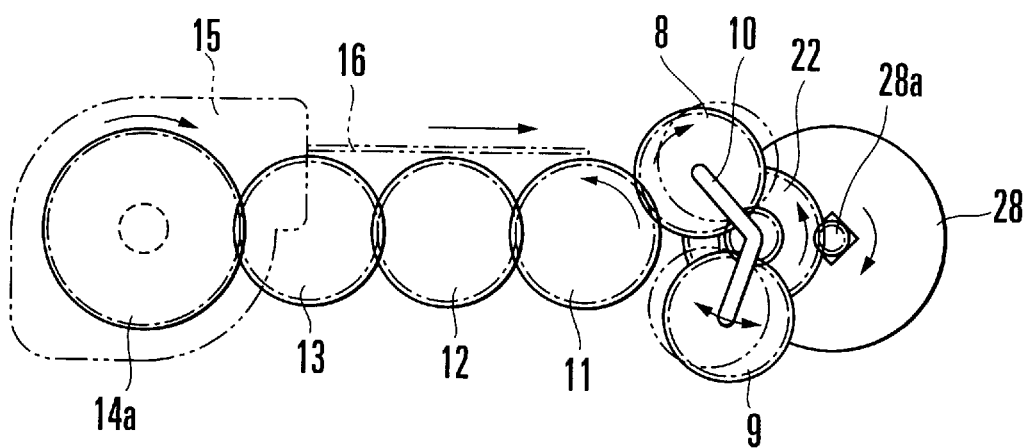
FIG. 16 is a plan view showing the film transport device according to the third embodiment in a state obtained during film winding driving.

In winding-driving the film 16 as shown in FIG. 16, as in the case of the thrust driving, the driving force of the motor 1 is transmitted to the film winding shaft 5 through the two-stepped planetary reduction mechanism and the output carrier 28. At this time, the thrust driving planet gear 8 is repelled by the idler gear 11. Therefore, the rotation of the output carrier 28 is not transmitted to the cartridge driving gear 14. Then, only the film winding shaft 5 is allowed to perform the winding driving action on the film 16.

Figure 17:
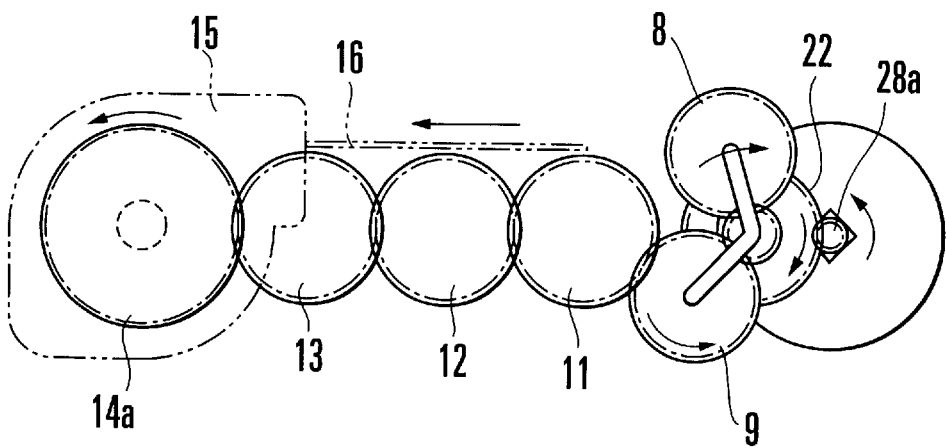
FIG. 17 is a plan view showing the film transport device according to the third embodiment in a state obtained during film rewinding driving.

In rewinding-driving the film 16 as shown in FIG. 17, the lock claws 28d of the output carrier 28 do not engage the engaging grooves 5b of the film winding shaft 5. Therefore, the driving force of the motor 1 is not transmitted to the film winding shaft 5. In this instance, the rewinding driving planet gear 9 comes to intermesh with the idler gear 11 to transmit the rotation of the output carrier 28 to the cartridge driving gear 14. Then, only the spool of the cartridge 15 is allowed to perform a rewinding driving action on the film 16.

(Modification of Third Embodiment)

Figure 18A:
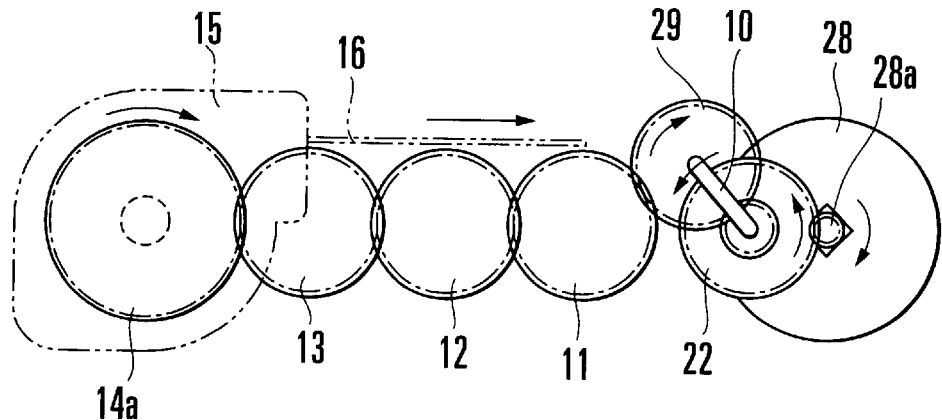
FIGS. 18(a) to 18(c) are plan views of a film transport device according to a modification of the third embodiment of the invention.
Figure 18B:
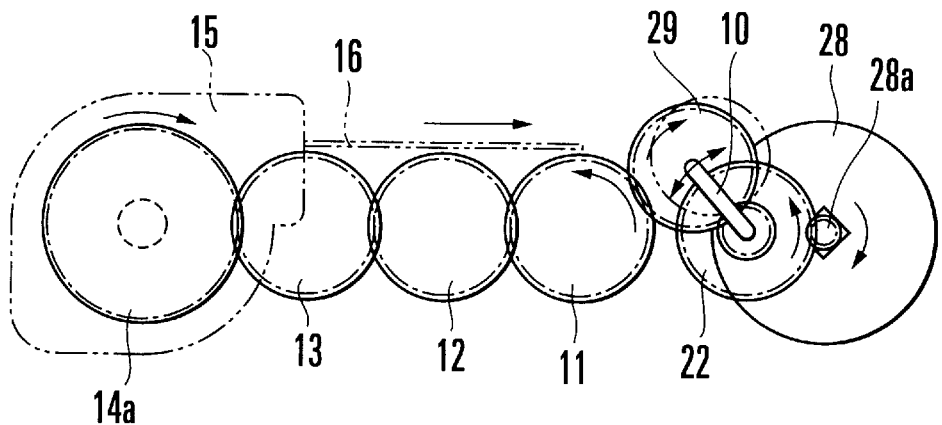
Figure 18C:
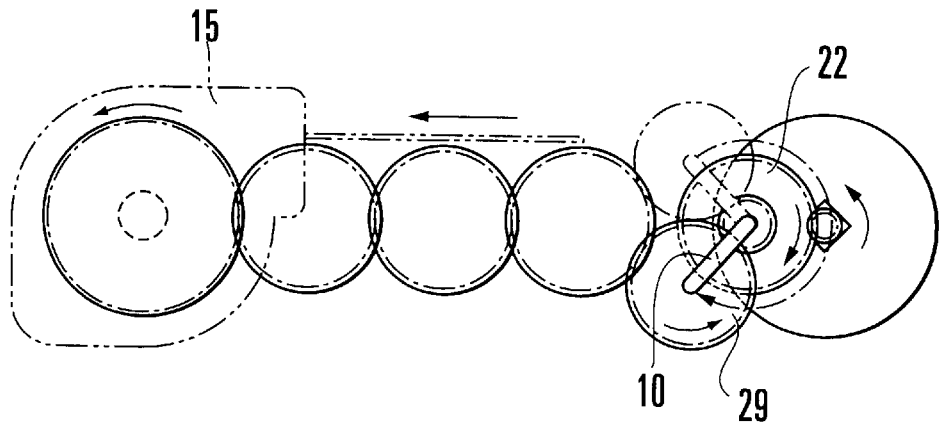
Figure 20A:
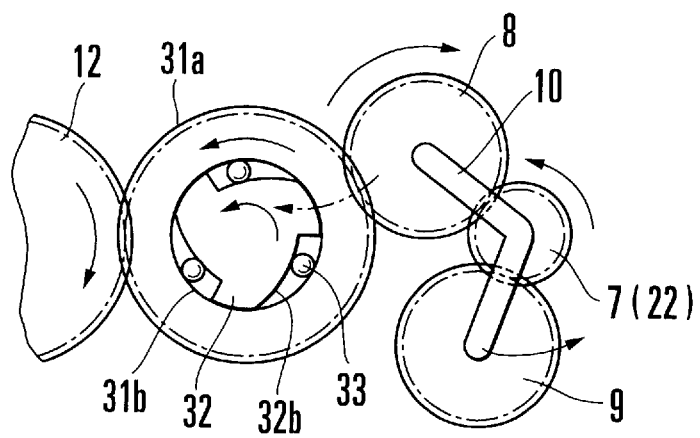
FIGS. 20(a) to 20(c) are plan views for explaining the operation of the film transport device according to the modification of each of the first, second and third embodiments.
Figure 20B:
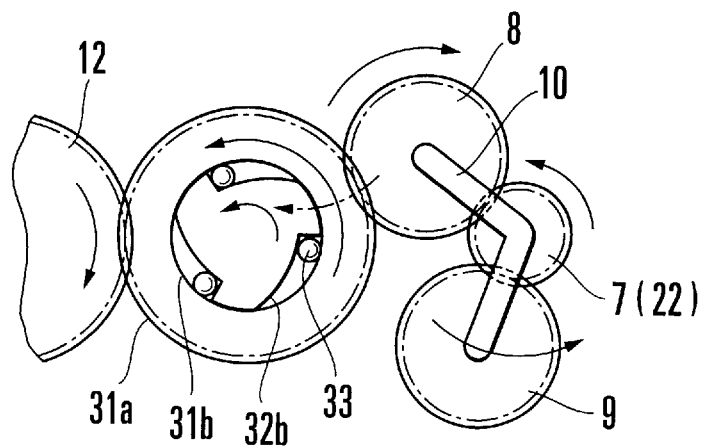
Figure 20C:
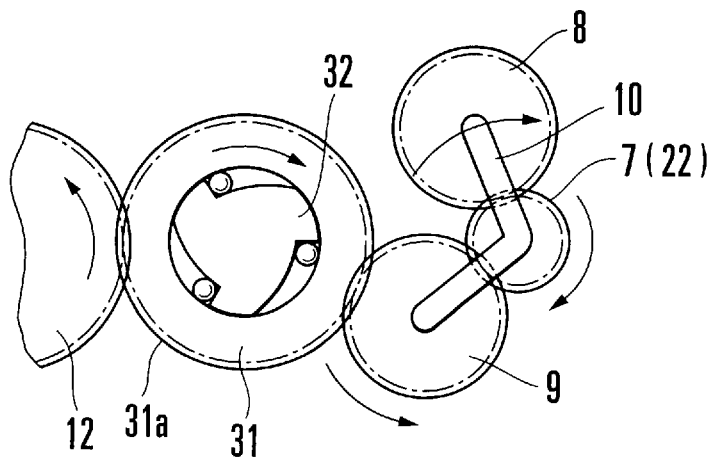

FIGS. 18(a), 18(b) and 18(c) show a film transport device according to a modification of the third embodiment of the invention. In FIGS. 18(a), 18(b) and 18(c), all components parts that are the same as those of the second embodiment are indicated by the same reference numerals as those used in the description of the second embodiment. FIG. 18(a) shows a thrust driving action in the modification of the third embodiment. FIG. 18(b) shows a film winding driving action. FIG. 18(c) shows a film rewinding driving action.

In the modification of the third embodiment, as in the modification of the first embodiment, both the first transmission change-over function of the thrust driving planet gear 8 and the second transmission change-over function of the rewinding driving planet gear 9 are arranged to be carried out by a single planet gear (transmission change-over clutch) 29.

Referring to FIG. 18(a), in thrust driving, the planet gear 29 meshes with the idler gear 11 to transmit the thrust driving force of the output carrier 28 to the cartridge driving gear 14. In film winding driving as shown in FIG. 18(b), the planet gear 29 is repelled by the idler gear 11, so that the driving force of the output carrier 28 is not transmitted to the cartridge driving gear 14. In the case of film rewinding driving as shown in FIG. 18(c), the planet gear 29, which is repelled by the idler gear 11, revolves clockwise around the sun gear 22 to come to intermesh with the idler 11. Then, the film rewinding driving force of the output carrier gear 28 is transmitted to the cartridge driving gear 14.

As described above, the modification of the third embodiment is arranged to switch the transmission of the thrust driving force, the nontransmission of the film winding driving force and the transmission of the film rewinding driving force from the output carrier 28 to the cartridge driving gear 14 from one over to another by means of a single transmission change-over clutch. This arrangement, therefore, permits reduction in number of parts and simplification of structural arrangement.

In each of the first to third embodiments of the invention and their modifications described above, a cartridge driving system is arranged to transmit the driving force of the motor 1 to the cartridge driving gear 14 through the idler gears 11, 12 and 13 by arranging the planet gears 8 and 9 to detachably engage the idler gear 11. However, this arrangement may be changed to arrange the planet gears 8 and 9 to directly come to engage and disengage the cartridge driving gear 14 by excluding the idler gears 11, 12 and 13.

(Modification of First to Third Embodiments)

FIGS. 19(a) and 19(b) and FIGS. 20(a), 20(b) and 20(c) show a film transport device according to a modification of the first, second and third embodiments described in the foregoing. In FIGS. 19(a) and 19(b) and FIGS. 20(a), 20(b) and 20(c), all component parts that are the same as component parts of the first, second and third embodiments disclosed are indicated by the same reference numerals as those used in the foregoing description of the first, second and third embodiments.

This modification differs from the first, second and third embodiments in respect of the second transmission change-over clutch located in the cartridge driving system, which includes gears from the cartridge driving gear 14 to the sun gear 7 or 22 intermeshing with the output gear part 4*b*, 21*b* or 28*e* of the rotation transmission gear 4 in the first embodiment, the carrier 21 in the second embodiment or the output carrier 28 in the third embodiment.

More specifically, in this modification, the idler gear 11 which is arranged to engage and disengage the planet gears 8 and 9 in the first, second and third embodiments is replaced with a double clutch gear. FIG. 19(*b*) shows the details of the double clutch gear. The double clutch gear is composed of an upper gear 30, a lower gear 31 which is arranged to rotate coaxially with the upper gear 30, a wind-mill type cam plate 32 which is arranged between the upper gear 30 and the lower gear 31 to be rotatable integrally with the upper gear 30, and steel balls 33 each of which is arranged between the outer side face of a cam part 32*b* of the cam plate 32 and the inner circumferential face 31*b* of the lower gear 31. The upper gear 30 has a shaft part 30*b* which has a plurality of projections in the circumferential direction thereof. The cam plate 32 has a fitting hole 32*a*. The upper gear 30 is made into one body with the cam plate 32 by fitting the shaft part 30*a* into the fitting hole 32*a* of the cam plate 32. The lower gear 31 has a center hole 31*c*. The upper and lower gears 30 and 31 are unitized to be coaxially rotatable by fitting the lower part of the shaft part 30*b* into the center hole 31*c* of the lower gear 31.

The thrust driving planet gear 8 is held by the planetary plate 10 in a position to intermesh with only the gear part 30*a* of the upper gear 30. The rewinding driving planet gear 9 is held by the planetary plate 10 in a position to intermesh with only the gear part 31*a* of the lower gear 31. Further, the idler gear 12 is in mesh with the lower gear 31.

This modification operates as follows. FIG. 20(*a*) shows a thrust driving action of the modification on the film 16. In this case, a driving force is transmitted through the gears in the sequence of the sun gear 7, the thrust driving planet gear 8 and the upper gear 30. Then, the upper gear 30 and the cam plate 32 are caused to rotate counterclockwise. In this instance, the steel balls 33 are squeezed in between the outer side face of the cam part 32*b* of the cam plate 32 and the inner circumferential side face 31*b* of the lower gear 31 to transmit the rotation of the cam plate 32 to the lower gear 31. This causes the lower gear 31 to rotate also counterclockwise. Then, the driving force is transmitted through the idler gears 12 and 13 to the cartridge driving gear 14. As a result, the film 16 is thrust-driven.

In winding-driving the film 16 as shown in FIG. 20(*b*), the driving force is transmitted through the gears in the sequence of the sun gear 7, the thrust driving planet gear 8 and the upper gear 30. Then, the upper gear 30 and the cam plate 32 rotate clockwise. However, when the film 16 which has been thrust-fed is tightly wound on the film winding shaft 5, a tensile force is generated on the film 16. The tensile force causes the cartridge driving gear 14 to make additional rotation. The additional rotation is transmitted to the idler gear 12 to cause additional counterclockwise rotation of the lower gear 31. Then, the rotating speed of the lower gear 31 comes to exceed the rotating speed of the cam plate 32. In FIG. 20(*b*), the length of an arrow mark indicates the magnitude of the rotating speed. As a result, the steel balls 33 are released from the state of being squeezed in between the outer side face of the cam part 32*b* of the cam plate 32 and the inner circumferential side face 31*b* of the lower gear 31. Then, the driving force from the thrust driving planet gear 8 acts only to cause the cam plate 32 to idly rotate and to transmit no driving force to the cartridge driving gear 14. The film winding shaft 5 is thus allowed to singly perform a film winding action on the film 16.

Further, in film winding, the planetary mechanism composed of the sun gear 7 (or 22) and the thrust driving planet gear 8 is not used as the second transmission change-over clutch. Therefore, unlike the first, second and third embodiments, the thrust driving planet 8 of the modification is not repelled. The film winding driving action thus can be accomplished with a less amount of fluctuations in film transport speed. This is a great advantage in cases where magnetic information is to be recorded or reproduced into or from a magnetic recording part of a film and where information on images recorded on the film 16 is to be detected while the film winding driving is in process.

In the case of rewinding the film 16 as shown in FIG. 20(*c*), the thrust driving planet gear 8 parts from the upper gear 30, and the rewinding driving planet gear 9 comes to mesh with the lower gear 31. The driving force is transmitted through the gears in the sequence of the sun gear 7, the rewinding driving planet gear 9 and the lower gear 30. Then, the driving force is further transmitted through the idler gears 12 and 13 to the cartridge driving gear 14. Under the condition thus obtained, the spool of the cartridge 15 is allowed to be singly driven to rewind the film 16 thereon.

Further, in the case of film rewinding, since there is no input to the upper gear 30, the film 16 can be adequately rewound irrespective as to whether the upper gear 30 and the cam plate 32 are caused to rotate together with the lower gear 31 by the squeezed-in state of the steel balls 33 or not caused to rotate together with the lower gear 31 as the steel balls 33 are released from the squeezed-in state.

The arrangement shown in FIGS. 19(*a*) and 19(*b*) may be variously changed and included in the cartridge driving system at any part thereof. For example, the lower gear 31 may be arranged as the cartridge driving gear 14 having the fork part 14*b*.

Each of the first, second and third embodiments and their modifications described in the foregoing is arranged to input a driving force from the rotation transmission gear 4, the carrier 21 or the output carrier 28, which rotates coaxially with the film winding shaft 5, directly to the cartridge driving system. Therefore, the driving force can be easily taken out from around the film winding shaft 5 in any of various directions. The arrangement thus facilitates allocating gears around the film winding shaft 5. Besides, the gears can be simply arranged.

According to the invention, the reduction mechanism which includes parts from the output part of the motor 1 to the rotation transmission gear 4, the carrier 21 or the output carrier 28 can be arranged in common for a film winding system and a cartridge driving system.

The disclosed arrangement for providing a one-way clutch between the rotation transmission gear 4, the carrier 21 or the output carrier 28 and the film winding shaft 5 permits smooth cancellation of the driving force transmission to the film winding shaft 5 in carrying out change-over from the film winding driving to the film rewinding driving.

The disclosed arrangement for having the first transmission change-over clutch disposed at a part of the cartridge driving system permits smooth change-over from the thrust driving to the film winding driving.

The disclosed arrangement for having the second transmission change-over clutch disposed at a part of the cartridge driving system permits smooth change-over from the film winding driving to the film rewinding driving.

Each of the embodiments disclosed is arranged to transmit a driving force by means of gears. However, the arrangement may be changed to transmit a driving force by some driving force transmission means other than the gears. For example, the driving force transmission means disclosed may be changed to use friction rollers.

The invention is applicable to cameras of varied kinds, such as a single-lens reflex camera, a lens-shutter type camera, etc., and also to film using apparatuses other than cameras, such as a film viewing apparatus, a film scanner or the like.

What is claimed is:

1. A film transport device comprising:
   a) a spool arranged to take up thereon a film pulled out from a film cartridge;
   b) a motor disposed within said spool;
   c) a spool gear arranged to have an output of said motor transmitted thereto and to drive said spool, said spool gear being disposed coaxially with said spool, said spool being driven only by a rotation in one direction of said spool gear; and
   d) a film cartridge driving mechanism for driving the film cartridge, said film cartridge driving mechanism being meshed with said spool gear in order to transfer a rotation force of said spool gear to said film cartridge driving mechanism.

2. A film transport device according to claim 1, further comprising a reducing transmission mechanism arranged to transmit the output of said motor to said spool gear while reducing in speed the output of said motor.

3. A film transport device according to claim 2, wherein said reducing transmission mechanism and said film cartridge driving mechanism are disposed in positions opposite to each other across said spool gear.

4. A film transport device according to claim 2, wherein said reducing transmission mechanism is a double gear having a large diameter part arranged to mesh with an output shaft of said motor and a small diameter part arranged to mesh with said spool gear.

5. A film transport device according to claim 4, wherein said spool gear has a large-diameter internal gear part and a small-diameter external gear part, said large-diameter internal gear part being arranged to mesh with said reducing transmission mechanism, and said small-diameter external gear part being arranged to mesh with said film cartridge driving mechanism.

6. A film transport device according to claim 4, wherein said spool gear has a large-diameter internal gear part and a small-diameter internal gear part, said large-diameter internal gear part being arranged to mesh with said reducing transmission mechanism, and said small-diameter internal gear part being arranged to mesh with said film cartridge driving mechanism.

7. A film transport device according to claim 4, wherein said spool gear has an internal gear part arranged to mesh with said reducing transmission mechanism and said film cartridge driving mechanism.

8. A film transport device according to claim 1, wherein said film cartridge driving mechanism includes a planetary clutch mechanism.

9. A film transport device according to claim 8, wherein said planetary clutch mechanism connects said spool gear and said film cartridge driving mechanism to each other until the film is wound on said spool.

10. A film transport device according to claim 8, wherein said planetary clutch mechanism disconnects said spool gear and said film cartridge driving mechanism from each other after the film is wound on said spool.

11. A film transport device according to claim 8, wherein said planetary clutch mechanism connects said spool gear and said film cartridge driving mechanism to each other when the film wound on said spool is to be rewound back to the film cartridge.

12. A film transport device according to claim 1, wherein said spool gear does not drive said spool when the film wound on said spool is to be rewound back to the film cartridge.

13. A film transport device according to claim 2, wherein said reducing transmission mechanism includes a fixed member having an internal gear formed therein, and an eccentric rotating member having an external gear formed to mesh with the internal gear of said fixed member and arranged to rotate eccentrically with respect to an output shaft of said motor.

14. A film transport device according to claim 2, wherein said reducing transmission mechanism is a planetary reduction mechanism.

15. A camera comprising:
   a) a spool arranged to take up thereon a film pulled out from a film cartridge;
   b) a motor disposed within said spool;
   c) a spool gear arranged to have an output of said motor transmitted thereto and to drive said spool, said spool gear being disposed coaxially with said spool, said spool being driven only by a rotation in one direction of said spool gear; and
   d) a film cartridge driving mechanism for driving the film cartridge, said film cartridge driving mechanism being meshed with said spool gear in order to transfer a rotation force of said spool gear to said film cartridge driving mechanism.

16. A camera according to claim 15, further comprising a reducing transmission mechanism arranged to transmit the output of said motor to said spool gear while reducing in speed the output of said motor.

17. A camera according to claim 16, wherein said reducing transmission mechanism and said film cartridge driving mechanism are disposed in positions opposite to each other across said spool gear.

18. A camera according to claim 16, wherein said reducing transmission mechanism is a double gear having a large diameter part arranged to mesh with an output shaft of said motor and a small diameter part arranged to mesh with said spool gear.

19. A camera according to claim 18, wherein said spool gear has a large-diameter internal gear part and a small-diameter external gear part, said large-diameter internal gear part being arranged to mesh with said reducing transmission mechanism, and said small-diameter external gear part being arranged to mesh with said film cartridge driving mechanism.

20. A camera according to claim 18, wherein said spool gear has a large-diameter internal gear part and a small-diameter internal gear part, said large-diameter internal gear part being arranged to mesh with said reducing transmission mechanism, and said small-diameter internal gear part being arranged to mesh with said film cartridge driving mechanism.

21. A camera according to claim 18, wherein said spool gear has an internal gear part arranged to mesh with said reducing transmission mechanism and said film cartridge driving mechanism.

22. A camera according to claim 15, wherein said film cartridge driving mechanism includes a planetary clutch mechanism.

23. A camera according to claim 22, wherein said planetary clutch mechanism connects said spool gear and said film cartridge driving mechanism to each other until the film is wound on said spool.

24. A camera according to claim 22, wherein said planetary clutch mechanism disconnects said spool gear and said film cartridge driving mechanism from each other after the film is wound on said spool.

25. A camera according to claim 22, wherein said planetary clutch mechanism connects said spool gear and said film cartridge driving mechanism to each other when the film wound on said spool is to be rewound back to the film cartridge.

26. A camera according to claim 15, wherein said. spool gear does not drive said spool when the film wound on said spool is to be rewound back to the film cartridge.

27. A camera according to claim 16, wherein said reducing transmission mechanism includes a fixed member having an internal gear formed therein, and an eccentric rotating member having an external gear formed to mesh with the internal gear of said fixed member and arranged to rotate eccentrically with respect to an output shaft of said motor.

28. A camera according to claim 16, wherein said reducing transmission mechanism is a planetary reduction mechanism.

* * * * *

UNITED STATES PATENT AND TRADEMARK OFFICE
CERTIFICATE OF CORRECTION

PATENT NO.     : 6,361,224 B1
DATED          : March 26, 2002
INVENTOR(S)    : Ryoji Okuno It is certified that error appears in the above-identified patent and that said Letters Patent is hereby corrected as shown below:

Column 5,
Line 63, delete "shaft to" and insert -- shaft 5 to --.

Column 7,
Line 21, after "while" insert -- the film winding is in process. --.

Column 9,
Line 59, delete "5a" and insert -- 5b --.

Column 10,
Line 8, delete "5a" and insert -- 5b --.
Line 27, delete "firs t" and insert -- first --.

Signed and Sealed this

Nineteenth Day of November, 2002

*Attest:*

*Attesting Officer*

JAMES E. ROGAN
*Director of the United States Patent and Trademark Office*